(12) United States Patent
Vergottini (10) Patent No.: US 11,989,794 B2
(45) Date of Patent: May 21, 2024

(54) SYSTEM AND METHOD FOR DOCUMENT EXTRACTION AND SYNTHESIS

(71) Applicant: Xcential Corporation, Encinitas, CA (US)

(72) Inventor: Grant Vergottini, San Marcos, CA (US)

(73) Assignee: XCENTIAL CORPORATION, Encinitas, CA (US)

( * ) Notice: Subject to any disclaimer, the term of this patent is extended or adjusted under 35 U.S.C. 154(b) by 611 days.

(21) Appl. No.: 17/018,233

(22) Filed: Sep. 11, 2020

(65) Prior Publication Data

US 2021/0082067 A1   Mar. 18, 2021

Related U.S. Application Data

(60) Provisional application No. 62/899,384, filed on Sep. 12, 2019.

(51) Int. Cl.
  *G06F 40/169*  (2020.01)
  *G06F 16/953*  (2019.01)
  (Continued)

(52) U.S. Cl.
  CPC .......... *G06Q 50/18* (2013.01); *G06F 16/953* (2019.01); *G06F 16/986* (2019.01);
  (Continued)

(58) Field of Classification Search
  CPC ............................. G06Q 50/18; G06F 40/169
  See application file for complete search history.

(56) References Cited

U.S. PATENT DOCUMENTS

| 2007/0061382 A1 | 3/2007 | Davis |
| 2013/0018873 A1 | 1/2013 | Velasco |

(Continued)

FOREIGN PATENT DOCUMENTS

WO   2011159843   12/2011

OTHER PUBLICATIONS

Petition to Institute Derivation and Exhibits for the present U.S. Appl. No. 17/018,233 dated Mar. 22, 2017.

(Continued)

*Primary Examiner* — Scott T Baderman
*Assistant Examiner* — Seung Woon Jung
(74) *Attorney, Agent, or Firm* — Joseph T. Miotke; Erin Ella Block; DeWitt LLP (57) ABSTRACT

The present invention is directed to a system and method for document extraction and synthesis. Specifically, a system and method for extracting portions of a document to be changed and automatedly synthesizing the changes to the extracted portion of the document to conform to the language and structure required for the final document. The present invention allows a user to modify an existing set of laws and automatedly transform the changes into a final document that complies with the specified language and format requirements for that final document. For example, a bill drafter can select a provision of existing law to modify and the system will transform the changes to the existing law into a bill to be presented before the lawmaking body that complies with all of the precise language and formatting requirements of bills to be presented. The present invention could be a stand-alone system or could be incorporated into current document drafting systems that are capable of supporting the functionality of the present application.

5 Claims, 8 Drawing Sheets

(51) Int. Cl.
*G06F 16/958* (2019.01)
*G06F 40/134* (2020.01)
*G06Q 50/18* (2012.01)
*G06Q 50/26* (2012.01)

(52) U.S. Cl.
CPC .......... *G06F 40/134* (2020.01); *G06F 40/169* (2020.01); *G06Q 50/26* (2013.01)

(56) References Cited

U.S. PATENT DOCUMENTS

| 2014/0013209 A1* | 1/2014 | Good | G06F 40/137 |
| | | | 715/250 |
| 2014/0281873 A1 | 9/2014 | Frew | |
| 2019/0102856 A1* | 4/2019 | Lyte | G06Q 50/18 |

OTHER PUBLICATIONS

International Preliminary Report on Patentability for PCT/US2019/041207 dated Jan. 21, 2021, from WIPO.
Office Action dated Mar. 31, 2021, in connection with U.S. Appl. No. 16/507,855, from the U.S. Patent Office.
Office action dated Mar. 17, 2022, in connection with U.S. Appl. No. 16/507,855 from the U.S. Patent Office.
International Search Report and Written Opinion for International application PCT/US2020/050371 issued from the European Patent Office dated Dec. 17, 2020.

* cited by examiner

SYSTEM AND METHOD FOR DOCUMENT EXTRACTION AND SYNTHESIS

CROSS-REFERENCE TO RELATED APPLICATION

The application claims priority to U.S. Provisional Application No. 62/899,384, entitled "System And Method For Document Extraction And Synthesis", filed Sep. 12, 2019, which is incorporated herein by reference in its entirety.

FIELD

The present disclosure is directed to a system and method for document extraction and synthesis, specifically a system and method for extracting portions of a document to be changed and automatedly synthesizing the changes to the extracted portion of the document to conform to the language and structure required for the final document.

BACKGROUND

Drafting legislative documents and regulations is tedious. This includes drafting changes to laws that must be introduced to the legislature as a bill. The introduction of a bill to the legislature requires adherence to very precise language used to specify, as concisely as possible, how the law is proposed to read or change and when the law is proposed to take effect. The term "bill" is used throughout as a catch-all term that encompasses bills, resolutions, amending regulations, and other forms of legislation that implement a formal change process. The term "law" is used throughout as a catch-all term that encompasses codes, statutes, rules, regulations, and other forms of law that are subject to the formal change process.

Due to the format requirements and precise language that legislatures require for a presented bill, a lawyer or other drafter cannot copy the law to be changed from the original source, make changes to the original source document, and simply present those changes to the legislature. Instead, language must be crafted that describes the changes using a precise arcane language and format. In the past, lawyers would perform the intellectual work of deciding how to amend the law using informal "back-of-the-envelope" techniques which would then be passed on to technical staff who would determine the precise language to be used in the bill as well as the necessary presentation or formatting aspects of the prepared document to be introduced into the rulemaking body.

Today, all of the responsibilities for drafting a bill, determination of precise language, and presentation/formatting belong to the drafting attorney. The drafting attorney must not only perform the intellectual task of identifying how the law is proposed to change but also handle the technical aspects of transforming the proposed changes into the precise amending language and formatting requirements of the legislature in order to introduce the bill.

There has not been a lot of automation in the legislative drafting processes. One closely related aspect of legislation that has seen substantial automation is the bill amendment process—not to be confused with the bill drafting process that amends the law. Bill amending is the process by which an introduced bill evolves when introduced in committee or on the floor of the chamber and modifications to that document are proposed, as bill amendments, and either adopted or rejected. The result of this process are bill amendments that proposes changes to bills. Bill amendments are a simple enumeration of discrete modifications to a bill expressed as amending instructions to specific passages of text often identified by page and line number. While a bill amendment modifies a bill, a bill itself modifies the law. The bill amendment process occurs after the bill drafting process that is discussed above. The automation that has occurred during bill amending assumes that the bill is already provided using the precise language and formatting that is required by the legislature. There has been little effort automate how a bill, itself, is crafted, to date.

SUMMARY

While modern computerization of the drafting process has helped alleviate some of the complications with the subsequent bill amendment process and has helped to alleviate some of the complexity and need for highly specialized skills in bill drafting language and typesetting in the bill drafting process, the result has caused the technical aspects of formatting and precise language requirements of the bill drafting process to crowd out much of the intellectual aspects of the work. Typically, bill drafting tools are built using either free-form general-purpose word processors such as MICROSOFT® Word or WORDPERFECT® or are built on highly specialized structured document editors such as ADOBE FRAMEMAKER™ or XML editors. Word processing applications have focused on ease-of-use but relied on manual drafting of all documents rather than rely on automation. The use of structured document editors is a more recent innovation that strives to strike a balance between ease-of-use and the elimination of manual steps through automation. This innovation has only partially realized its full potential due to the complexity of matching automation techniques with preexisting procedures bound by ancient traditions and often constitutionally dictated. The generation of bill language has been particularly difficult to automate due to the reluctance to revise the rules that guide this language to a form that is easier for automation tools to express. While the crafting of this language is a key part of the value add provided by the drafting attorney, it quickly becomes part of the bottleneck in the system. None of the current bill drafting tools allow the user to create in-line in-context changes to the original text of the legal provision to be changed and then automatedly generate a bill from those changes with the appropriate language required by the jurisdiction where the bill is to be presented.

Therefore, the attorney's time available for the intellectual aspects of the work is either reduced or the attorney's productivity is reduced. Accordingly, there is an unmet need in the art to rebalance the workload of bill drafting and presentation, allowing the attorney to spend more time on the intellectual work of deciding how to change the law, rather than how to construct, organize and present those changes to the law as a bill.

The present application overcomes the current shortcomings of the current method of drafting a bill by automating the more technical aspects of selecting laws to be changed and transforming those changes into the prescribed language of a bill and generating the bill document according to drafting rules required by the legislation, thereby allowing the bill drafter to once again focus on the intellectual task of determining how the law is proposed to be changed. The present application allows a user to make in-line in-context changes to the original law and then automatedly transforms those changes into a generated bill that uses the prescribed language and format required by the legislature. The present application could be a stand-alone system or could be incorporated into current bill drafting systems that are capable of supporting the functionality of the present application, such as LEGISPRO®.

The systems and methods described herein are directed towards drafting documents that amend a body of laws following a formal process that involves prescribed language and structure for the presentation of the document. The most direct application of this technology is for the amending of laws using bills. This process can also apply to other law-making processes such as amending regulations—if the jurisdiction applies such a process. In many countries with a legal heritage in the Westminster system (primarily Commonwealth countries), regulations are known as secondary legislation while bills and the resulting acts, known as statutes, are known as primary legislation. In that case, regulations, and other forms of secondary legislation such as rules and orders, are subject to the same formalized amending process and can benefit from this form of document synthesis.

One embodiment of the present invention is directed to a method of bill synthesis. The method of bill synthesis includes receiving at least one provision of law to be included in a snapshot document. The snapshot document includes a set of original text for each provision of law to be changed. The method of bill synthesis further includes determining a formalized reference for each provision of law included in the snapshot document. The formalized reference is an original location for the provision of law. The method of bill synthesis further includes receiving at least one in-line change to the set of original text for each provision of law. The at least one change includes an insertion of text or a deletion of text into the text of the provision. The method of bill synthesis further includes assigning each in-line change to at least one change set such that each change set represents a different legal effect, and such that each change set groups each in-line change to the same legal effect. The method of bill synthesis further includes receiving change set metadata associated with each change set. The change set metadata includes a set of dependencies. The method of bill synthesis further includes creating an updated snapshot document including the set of original text for each provision of law, the formalized reference to each provision of law, the in-line changes, the change sets, and the change set metadata for each change set, automatedly extracting and enumerating from the updated snapshot document the change sets, automatedly extracting from the updated snapshot document the change set metadata for each change set, and automatedly extracting and enumerating all changes made to the set of original text for each change set. The extraction includes a reference to an exact location in the set of original text where the change occurs. The method of bill synthesis further includes clustering adjacent changes for each change set together to create an enumerated list of changes for each change set and constructing an internal data structure for each extracted change set. The data structure includes a hierarchical representation of the changes to be made for each change set, the change set metadata, and the formalized reference for each provision included in the change set. The method of bill synthesis further includes creating an XML changes document for each data structure constructed from the updated snapshot document, analyzing the XML changes document based on a template library to determine at least one template model to synthesize a bill representation, mapping the XML changes document to the at least one template model to create jurisdiction specific language for the bill representation using the changes from each change set in the data structures of the XML changes document, and generating the bill representation based on the mapping. The bill representation provides the in-context changes from the updated snapshot document, the change set metadata from the updated snapshot document, and the formalized reference for each provision in a formalized manner and a manner required by a particular jurisdiction. The method of bill synthesis further includes displaying to a user the generated bill representation and presenting the generated bill representation to a legislature for the particular jurisdiction.

One embodiment of the present invention is directed to a method of bill synthesis. The method of bill synthesis includes creating a snapshot document. The snapshot document includes at least one provision of law to be changed and a formalized reference to an original location for each provision of law to be changed. The method of bill synthesis further includes receiving changes to the snapshot document to create an updated snapshot document. The updated snapshot document includes at least one insertion or at least one deletion to each provision of law to be changed, at least one change set, and change set metadata for the at least one change set. Each deletion and each insertion is assigned to at least one change set. The method of bill synthesis further includes analyzing the updated snapshot document based on extracting and enumerating each change set and change set metadata and enumerating each addition and each deletion belonging to the change set to create a hierarchical internal data structure for each change set, constructing an XML changes document with each hierarchical internal data structure created for the updated snapshot document, analyzing the XML changes document to generate a bill representation by determining a template model from a template library to synthesize the XML changes document, and presenting the bill representation to a legislature of a jurisdiction in a format required by the jurisdiction.

One embodiment of the present invention is a system including a processor, a graphical user interface and a non-transitory computer readable medium that when executed by the processor instructs the processor to perform the methods of bill synthesis listed above.

While we use the example throughout of drafting a bill, it is contemplated that other forms of legal documents or documents from other industries subject to formalized amending processes and language requirements, could also be the subject of document synthesis.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Embodiments of the methods and systems disclosed herein may be stand-alone systems or may build on prior innovations. In some embodiments, the methods and systems disclosed herein build on the existing XML-based capabilities of LEGISPRO® including the unique Change Set mechanism which is used to group and categorize changes to a document. Change sets are disclosed in U.S. patent application Ser. No. 16/507,855, filed Jul. 10, 2019, which is hereby incorporated by reference in its entirety. In embodiments, the methods and systems disclosed herein may use the capabilities of change sets of LEGISPRO®. However, in other embodiments, it is possible that an alternative mechanism for grouping and annotating changes could be used.

Figure 1:
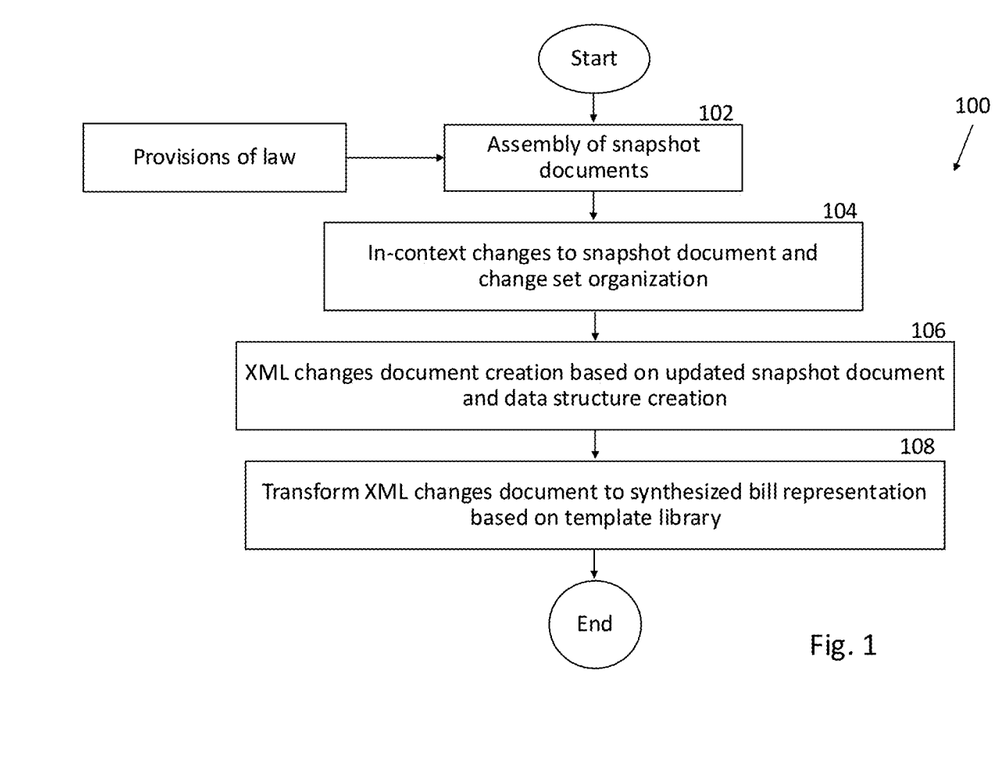
FIG. 1 depicts an exemplary embodiment of a method for law selection and document synthesis.

FIG. 1 depicts a method 100 for law selection and bill synthesis.

At step 102, a snapshot document is created that will allow the user to introduce the proposed changes to the law to be changed. A snapshot document is a document consisting of the portions of existing law that are to be changed and incorporated into the bill to be created. The snapshot document also contains annotations to allow the system to determine precisely where those portions of existing law were taken from. Essentially, the snapshot is a compendium of text and underlying structure from the identified provisions to be changed. Preferably, the document will be created in LEGISPRO® which incorporates the advanced change set-based track changes features disclosed herein. However, the creation of a snapshot document can be configured to function on any text editor that is compatible with XML editing.

Figure 2:
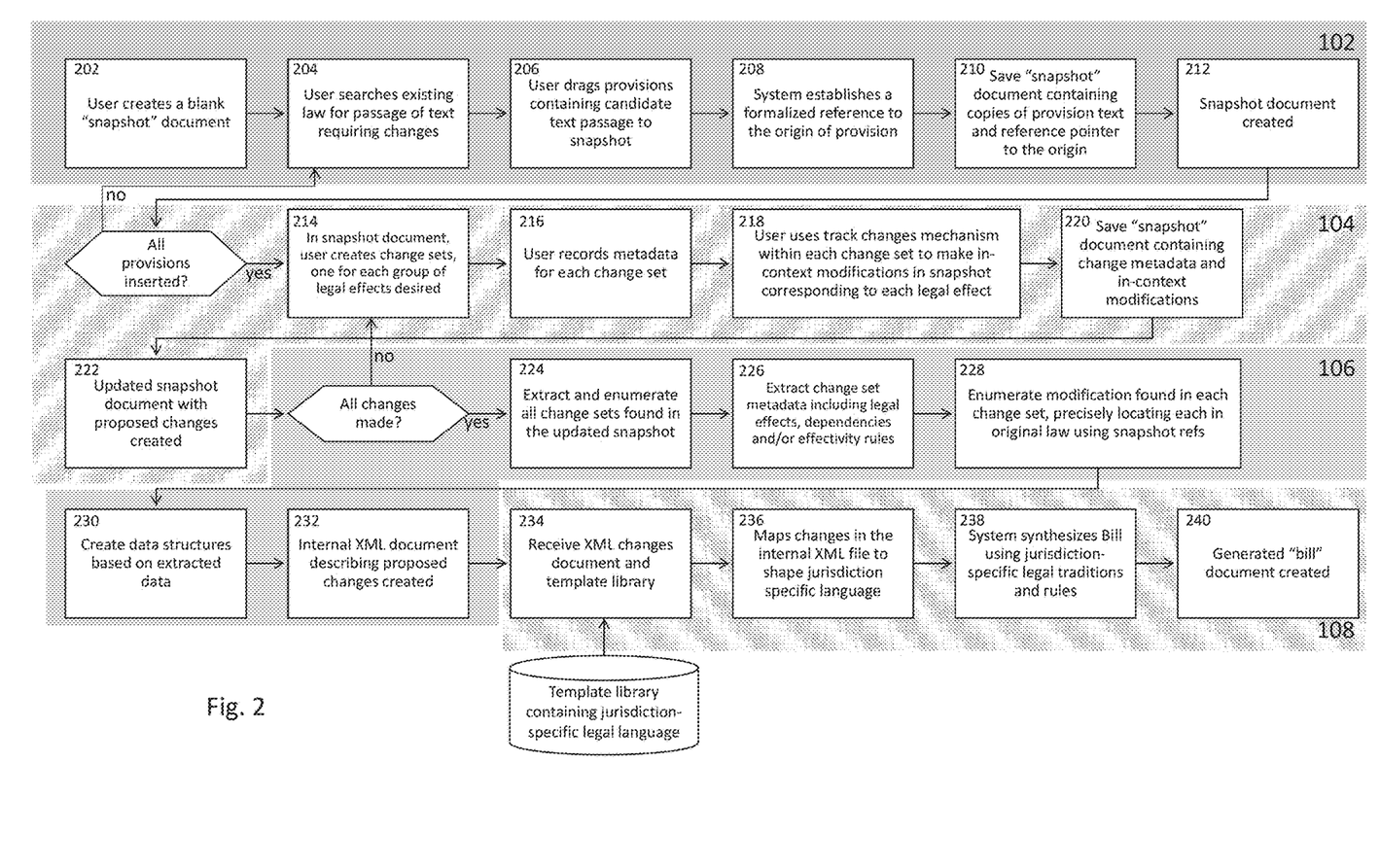
FIG. 2 depicts an exemplary embodiment of a method of performing method 100 depicted in FIG. 1.

FIG. 2 depicts an example method 200 that includes a method for step 102, creating a snapshot document.

In this embodiment for creating a snapshot document, at step 202, a blank snapshot document is created. In embodiments, the snapshot document is created in a standard word processing system where the current invention has been configured to function with the standard word processing system. In other embodiments, the document is created in LEGISPRO® which is specifically configured to integrate with the current invention.

At step 204, a search of the existing law is performed to locate the portions of text requiring changes for the bill. In an embodiment, the drafting attorney conducts a search through the existing laws (statutes, codes, etc.) and determines what specific provisions needs to be changed in order to affect the proposed change. In embodiments, the search may use preexisting capabilities offered by the editor, other websites, and/or manual methods. In embodiments, portions of the searching may be automated. For example, the drafting attorney may input or select a specific provision for modification and the system may automatedly determine any other provisions that will also need modification based on the original provision to be modified.

Figure 4:
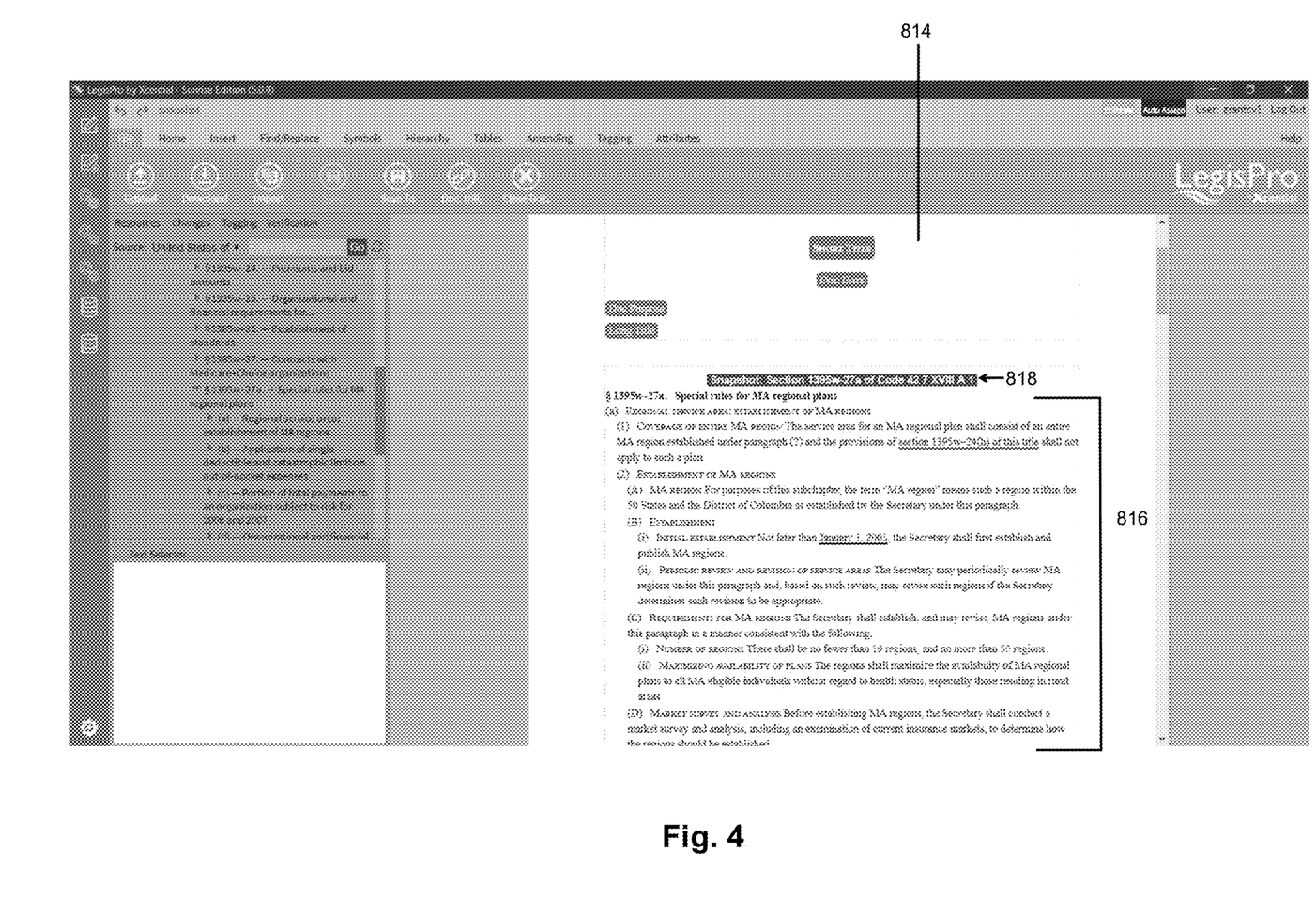
FIG. 4 depicts an exemplary embodiment of a snapshot document.

At step 206, once the provisions to be changed have been identified, the provisions are copied from a reliable data source such as an internal database or external data service and incorporated into the snapshot document. In an embodiment, the user selects the section of text needing changes from the existing law and drags it onto the blank snapshot window. As is depicted in FIG. 4, in an embodiment, the snapshot is created by copying the text (and structure) of the provisions into a new XML document. The snapshot is a compendium of text and underlying structure from the identified provisions to be changed.

At step 208, a formalized reference pointing to the origin of each provision is established by the system and associated with each provision in the snapshot document by adding an annotation to the provision in the snapshot document. In an embodiment, the provisions of the law that are incorporated into the snapshot document are identified by the snapshot using formalized reference pointers that express the legal citation as a URL. These URLs point to where the original source of text of the provisions originated in the law. Therefore, based on the ability to particularly reference the location of the law to be changed, only the particular provision of the law that is being changed needs to be incorporated into the snapshot document, rather than the entire law. In embodiments where the legal provision is taken from a curated database or source that includes the legal citation of the copied provision in metadata of the copied text, the system automatically analyzes the citation metadata and converts it to the formalized reference pointer. An example of such a curated database would be the LEGISPRO® database of legal provisions. In embodiments where the legal provision is taken from a source that does not include the citation as metadata to the copied text, the user will enter the legal citation into the snapshot and the system will then analyze the citation and convert it to the formalized reference pointer.

At optional step 210, once all of the provisions of law to be changed are incorporated into the snapshot document, the snapshot document can be saved for later access. The saved snapshot document contains the provisions of law to be changed and the formalized reference to the origin of each provision.

At step 212, once all of the provisions of law to be changed are incorporated into the snapshot document, the snapshot document is completed and ready for changing. The provision text within a snapshot may come from one or more source documents of law. The snapshot is the drafting attorney's working document to edit from which the bill will be synthesized. In an embodiment, the snapshot document will be displayed in a graphical user interface to the user displaying the text of the provisions to be changed exactly as they were taken from the original source. For example, if the original source of law included a typographical error, that same error would be repeated in the snapshot document. The reference pointer to the original source of the provision may or may not be displayed with the text of the provision.

Figure 5:
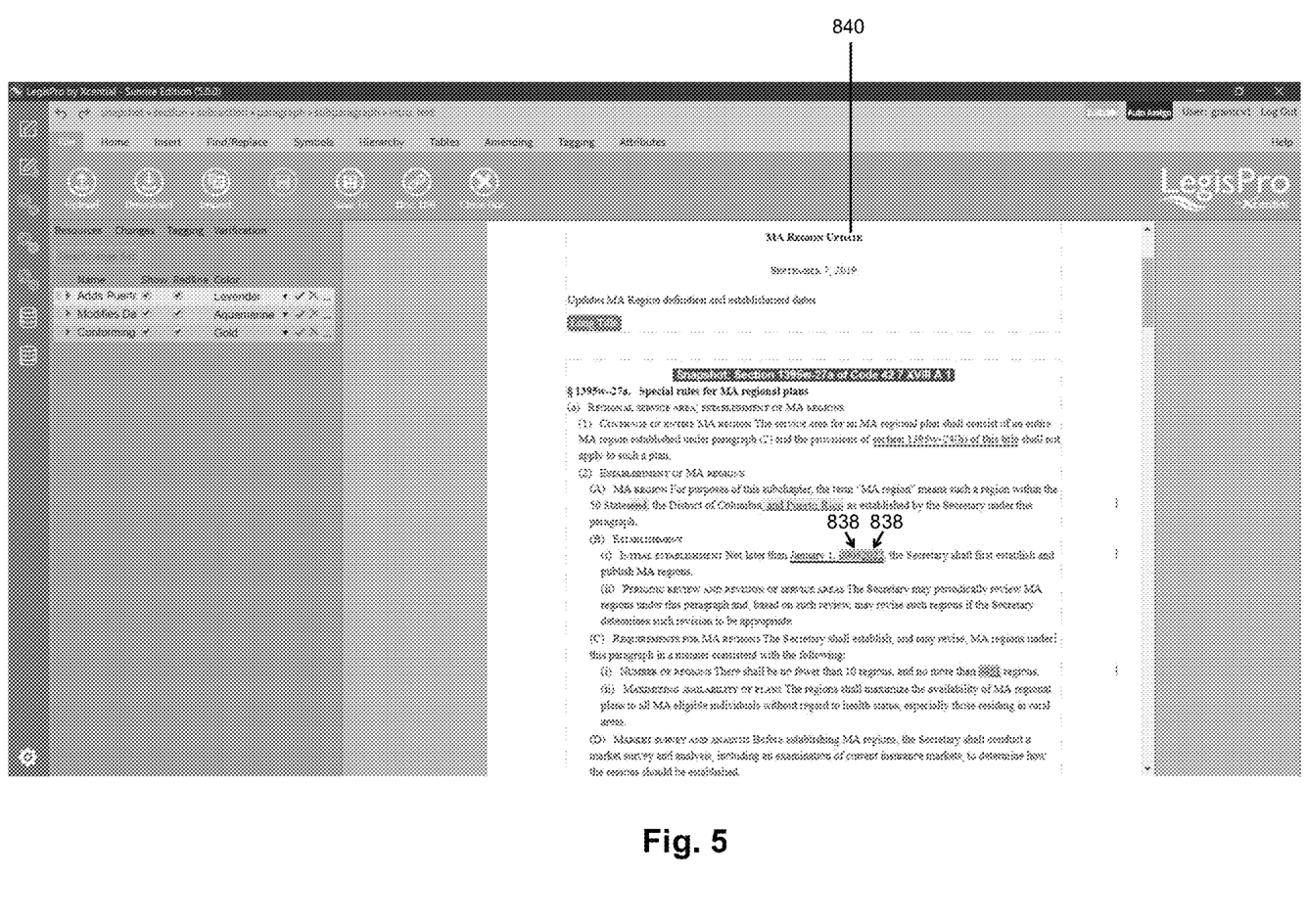
FIG. 5 depicts an exemplary embodiment of a snapshot document with changes made to the snapshot document.

Referring back to FIG. 1, at step 104, changes are made to the provisions in the snapshot document that express the law as it is proposed to read. As is illustrated in FIG. 5, the modifications to the snapshot document are performed in-context using some method of change tracking. Ideally, the method of track changes will use and incorporate change sets as defined in LEGISPRO®. This allows the user to make in-line changes to the provisions of the law and input record metadata for each group of legal effects—defining the legal effect, its dependences, the effective date, etc. If the changes are treated as accepted, the drafter can see how the new law will read if enacted. In embodiments, the change tracking will be categorized (i.e. color-coded categories) and may also incorporate other features of the editor. In embodiments, the change tracking abilities will include a robust set of change tracking features including change sets and nested changes as provided by the LEGISPRO® editor. In embodiments where the methods and systems disclosed are incorporated as part of a preexisting editor, the in-context edits will be made using the preexisting editor with the robust set of change tracking features configured to incorporate with the preexisting editor. The change tracking capability of the editor is used to record the edits that are made as discreet insertion and/or deletion modifications. These insertion and deletions are recorded in the XML structures. In embodiments using LEGISPRO® the recordation of insertions and deletions in the XML structures are a preexisting feature of LEGISPRO®. In many cases, the changes that are proposed can have a complex effect on the law—making different changes for different reasons, coming into effect at varying dates, or other complexities. To capture this intent, the unique change set capability of LEGISPRO® may be used. In embodiments implemented using LEGISPRO®, change sets allow edits, being recorded as insertion and/or deletions, to be grouped into sets which can have metadata applied to them as a whole. In embodiments not using change sets, an alternate mechanism for recording metadata common to a grouping of modifications must be provided. This metadata can, among other things, describe the overall intent of the group of changes or assign an effective date. While describing the intent and effective data are the most common forms of metadata the attorney might want to record, the metadata mechanism is generalized so that other uses or relationships can be established such as dependencies on other change groups or the origins of the request for a change. In embodiments that do not use LEGISPRO® or the change set capabilities provided by LEGISPRO®, a mechanism for grouping and annotating changes that is compatible with the bill synthesizer will be needed.

FIG. 2 depicts an example method 200 that includes a method for step 104, changing a snapshot document. In this embodiment, the editor being used to modify the snapshot documents is either LEGISPRO® or an editor compatible with a configuration of the advanced track changes features offered by LEGISPRO®.

In this embodiment for creating a snapshot document, at step 214, change sets are created to group the changes associated with each different legal effect in the snapshot document. Each different legal effect to be caused by the changes made to the text of the provisions will be represented by a different change set. A legal effect may be a change in a tax, a prohibition, an incentive, among others. In addition, consequential or follow-on effects may need handled where the changes being proposed affect other existing aspects of the law. For example, a proposed change to existing law may be to lower a set of certain taxes and to provide additional time to pay said taxes, this would likely constitute two legal effects and two change sets. The first change set and legal effect would contain all changes required to adjust the tax rate to the new proposed amount. The second change set and legal effect would contain all changes required to extend the time limit to the proposed time limit. This is merely an example of the use of change sets to group legal effects. It should be understood that the change sets can be used to group and define legal effects in any way the user believes is appropriate for the changes to be made. In addition, consequential or follow-on effects that may need to be handled where the changes being proposed affect other existing aspects of the law may be legal effects.

At step 216, the metadata for each change set created is determined. The change set metadata includes, but is not limited to, description of legal effect, dependencies of the change set, and effectivity rules for the change set. Effectivity rules for the change set would include the date the proposed change would go into effect. This could be reflected as a specific date, a length of time after approval, or some other way of determining the effective date of the changes. The dependencies define consequences for the change set being adopted. For example, if one change set is adopted another change set may have a dependency that dictates that change set must also be adopted or that that change set cannot be adopted.

At step 218, using a change tracking mechanism in the editor of the snapshot document, in-context changes are made to the provisions in the snapshot document corresponding to each legal effect.

At optional step 220, once all of the change sets are created and the changes to the text of the provisions are made, the updated snapshot document can be saved for later access. The saved updated snapshot document contains the provisions of law to be changed, the formalized reference to the origin of each provision, the defined change sets with the determined metadata, and the in-line in-context changes to the provisions.

At step 222, once all of the change sets are created and the changes to the text of the provisions are made, the updated snapshot document is created and ready for synthesis. Embodiments that do not use the advanced change tracking features as described in LEGISPRO®, particularly the change sets feature, will require a mechanism for grouping changes and providing the applicable metadata necessary for implementing those changes compatible with the bill synthesis system disclosed herein. In embodiments, the updated snapshot document is displayed on a graphical user interface to the user displaying the text of the provisions included in the snapshot documents and displaying the in-line in-context changes made to the text as insertions or deletions, as illustrated in FIG. 5. Further, the changes belonging to each change sets may be visually distinguished in the snapshot document by use of unique colors, unique underlining, or other visually distinct mechanisms.

Referring back to FIG. 1, at step 106, the bill synthesis process is started by transforming the updated snapshot document into an XML changes document that expresses the changes as series of change instructions. The updated snapshot document is passed to the document synthesis engine for analysis and transformation into the XML changes document.

The document synthesis engine works by analyzing a snapshot document. The snapshot document is composed in XML containing all the necessary information, drafted in-context, as described above, and contains all the necessary metadata such that a properly constructed and formatted bill can be produced. It should be understood that any document composed in XML could be a snapshot document provided the XML document contains the necessary information and metadata for the bill synthesis. The bill synthesis engine examines the updated snapshot document and identifies all of the reference pointers, changes sets (if being used), changes (insertions and deletions), and any other modifications found in the snapshot.

FIG. 2 depicts an example method 200 that includes a method for step 106, transforming the updated snapshot document into an XML changes document. In this embodiment, the updated snapshot document was created either in LEGISPRO® or an editor compatible with a configuration of the advanced track changes features offered by LEGISPRO®.

In this embodiment for creating the XML changes document, at step 224, the document synthesis engine receives an updated snapshot document and extracts and enumerates all change sets found in the updated snapshot document by copying the list of change sets into its internal data structures At step 226, the document synthesis engine extracts the change set metadata from the updated snapshot document by copying all metadata related to the changes sets into its internal data structures. This metadata includes but is not limited to the legal effect description, the dependencies and effectivity rules.

At step 228, the document synthesis engine enumerates the in-context changes (insertions and deletions) made in each change set of the updated snapshot document by copying the text and the metadata of each change into its internal data structures. For each change, the reference pointer (a form of a citation meaningful to the system) contained in the snapshot document is used, along with positioning information calculated by counting preceding or following words, is used to precisely locate the change in the original law.

Figure 7:
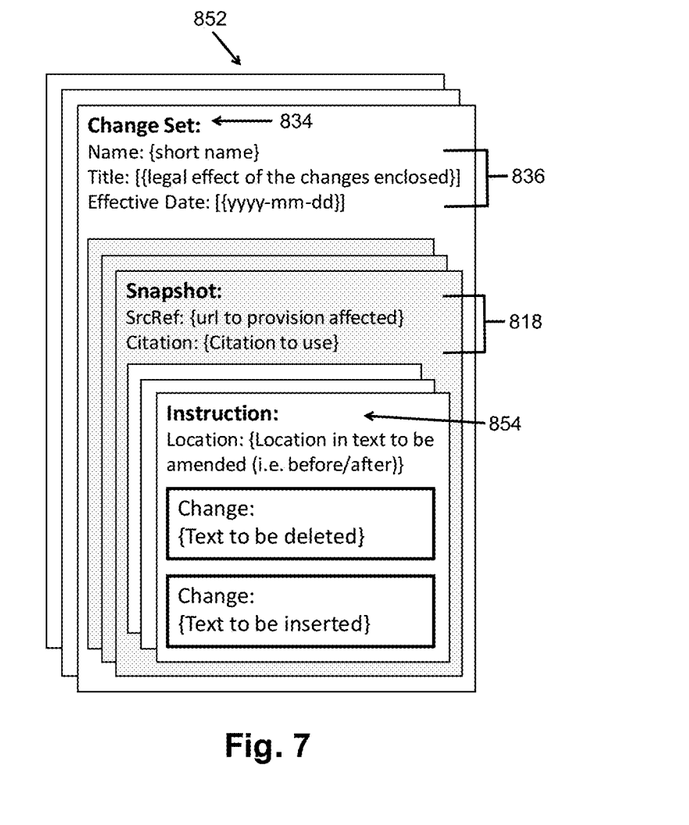
FIG. 7 depicts an exemplary embodiment of a document synthesis data structure.

At step 230, the document synthesis engine creates nested internal data structures based on the information extracted in steps 224-228 to structure the information from the updated snapshot document. Within each change set, the document synthesis engine clusters adjacent modifications to create an enumerated list of changes within each change set for the internal data structure. Modifications, either insertions or deletions, are considered to be adjacent when they are contained within the same change set and are not separated by any unmodified text or text belonging to another change set. FIG. 7 depicts an example of an embodiment of an internal data structure. The data structure organizes the information in a hierarchical manner, where the top-level organizational construct is the change set. In additional embodiments, the change sets may also be incorporated into the lower levels of the data structure. In still further embodiments, the change set may be a lower level of the data structure groups and another level of the data structure may be the highest level. In embodiments where change sets are not being used, these organization levels and/or incorporations are omitted. The next level of the data structure groups the data based on the provision of law being changed. Each provision is referenced by the identifying reference pointer. Ideally the identification of the provision will include the version of the provision, specifying the precise text at a specific point-in-time that is being amended. Then, within each identified provision, change instructions are formulated. Change instructions group individual modifications (insertion and deletion) together when their effect is connected (i.e. substitute "this" for "that" would be two changes—delete "this" and insert "that").

The bill synthesis engine analyzes each modification to determine how the instruction is to store the location of the change. For example, the modification should be following/ preceding the nth occurrence of specific text. The metadata, such as the title, effective date, reference pointers, etc., found with each level of this hierarchical structure are added to the appropriate levels in the data structure.

At step 232, once the data structures are constructed in memory, the data structure is then expressed as an intermediate XML document. This XML document is an intermediate format that is a part of the information pipeline rather than an output. Optionally, the intermediate XML document can be saved for later use. The XML document contains all of the change set information and metadata from the updated snap shot, the provision metadata from the updated snap shot, and all of the change information including the location information determined in step 228 as a set of data structures.

Referring back to FIG. 1, at step 108, the intermediate XML document is then transformed into the bill representation using a transformation engine. In an embodiment, the intermediate XML document is transformed using XSLT or some other transformation technology. In an embodiment, the bill representation is modelled as an XML document. In embodiments incorporating a preexisting editor, the system will be implemented to work with the abilities of the preexisting editor's change tracking features. In an embodiment, the system is able to directly transform the data structure into the bill representation. The bill representation conforms to the precise language, construction, and formatting necessary for the bill to be introduced into the lawmaking body.

FIG. 2 depicts an example method 200 that includes a method for step 108, transforming the XML changes document into the bill representation. In this embodiment, the updated snapshot document was created either in LEGISPRO® or an editor compatible with a configuration of the advanced track changes features offered by LEGISPRO®.

In this embodiment for creating the bill representation, at step 234, the XML changes document and applicable template library are received by the transformation engine.

At step 236, the XML changes document is matched to the appropriate template from the template library and the changes in the XML changes document are mapped to the template by selecting the template that precisely expresses the designed effect matching the available criteria. The criteria used to select the appropriate template is determined by the transformation engine using the hierarchical information in the data structures of the XML changes document. The transformation engine analyzes the types of changes within the change set and the change set metadata available to determine the most appropriate template for the change set. In an embodiment, the template library contains an exhaustive suite of amending snippets that conform to the drafting rules and precise language prescribed by the different law-making bodies. Each template is a set of instructions and rules that will determine the precise wording of the bill representation based on the changes and data depicted in the XML changes document, including the type of changes to be made, the legal effect of the changes, the source of the law to be changed, etc. It should be understood that templates are jurisdiction specific based on the precise language required for bills in each jurisdiction. In an embodiment, this step may be automated, and the appropriate template is determined by the system. In an embodiment, this step may be determined by the user who selects the appropriate template. It should be understood that templates for other industries that require specific language and structure for documents could also be used in the system. It should be understood that each XML changes document may require numerous templates to process all of the changes into the bill representation.

Each jurisdiction or even each legislative chamber may have their own rules for how a bill is structured and worded. These differences are handled by the library of templates used to formulate the bill. In an embodiment, each jurisdiction or chamber may have a different template library or may have individual templates in the template library. In embodiments where XSLT is used as the transformation language, the library templates are modelled as parameterized XSLT templates. In embodiments, a master transform file contains a series of general-purpose templates as well as incorporating the jurisdiction-specific templates, referenced as inclusions. In this embodiment, once all the appropriate templates have been assembled, a transform engine is executed to produce the resulting bill. In this embodiment, an example of an appropriate transform engine is the Saxon XSLT application. In this embodiment, the resulting bill is an XML document which conforms to the precise language, construction, and formatting necessary for the bill to be introduced into the lawmaking body.

At step 238, the transformation engine synthesizes the bill representation based on the XML changes document mapping to the template(s).

Figure 6:
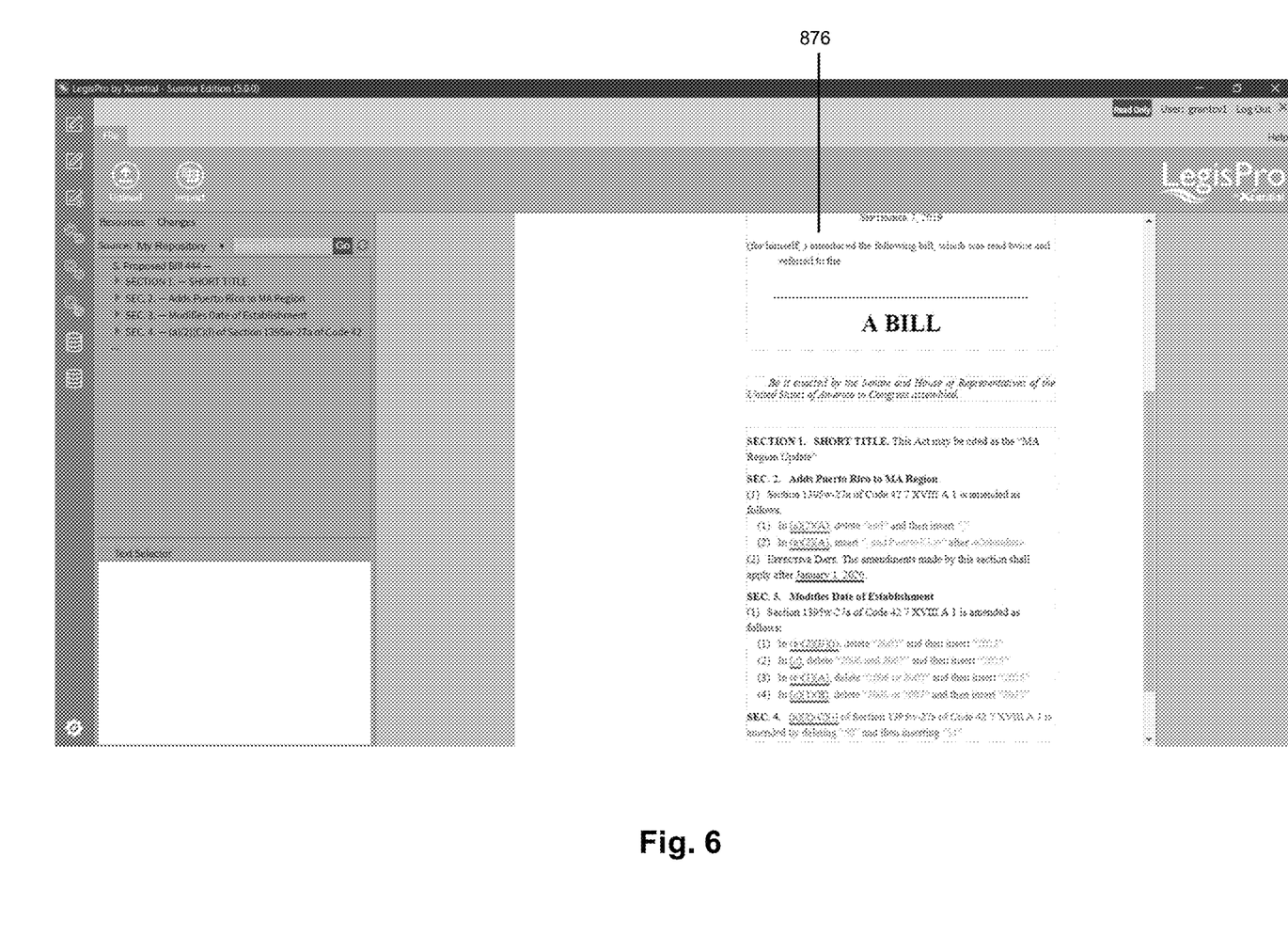
FIG. 6 depicts an exemplary embodiment of a synthesized bill based on the changes made to the snapshot document.

As is illustrated in FIG. 6, law changing language for bills is automatically drafted using the template based on the changes made to the snapshot document which results in a formal bill document that uses the precise language prescribed by the lawmaking body and the precise format required by the lawmaking body in which the bill is to be introduced. In an embodiment, the bill synthesis engine uses the information found in the intermediate XML file to select the template which best implements the desired change—in the form of one or more statements that add to, amend, or repeal existing law. Typically, the language of a bill will vary if there are multiple legal effects, different effective dates, single or multiple provisions being amended, dependencies on other proposed changes to the law, or other characteristics recorded in the metadata.

While the changes made to the snapshot document are made in-context to the original law being changed, the format of the presented bill is visually and contextually quite different. For example, many legislative bodies require that bill present changes to source law in a hierarchical manner, rather than how the law will read when the changes have been adopted. This example is illustrated in FIG. 6. Sometimes, the way changes in a bill are presented are referred to as "cut-and-bite amendments" because of the manner in which they precisely isolate the modifications to be made. How the changes are organized in a bill will depend on a number of factors, including how the lawmaking body requires the bill to be presented. In embodiments using the change sets features of LEGISPRO®, the construction of the change sets will also determine how the changes are organized in the bill by allowing changes to be grouped by legal effect, effective date, or some other grouping. These groups will determine if the changes are each their own section of a bill, subsections grouped by provision or effect, or even lower level paragraphs in more complex cases. An example of this embodiment is illustrated in FIG. 6. Additional supporting provisions may be added to indicate conditions or dates of effectivity.

At step 240, the bill representation document is created in compliance with the format required by the applicable jurisdiction. The completed bill representation document is presented for the bill amendment process and is configured to be used in the bill amendment process. Optionally, the bill representation document can be saved for future use. In embodiments, the bill representation will be presented to a user in a graphical user interface where the changes to the original provisions are displayed in the textually structured manner required by the jurisdictional legislative body. Each legislative body may have its own textual requirements for presentation of changes of law in bill format. For example, one jurisdiction may require that all changes taking effect on the same date will be presented in a single section in chronological order, whereas another jurisdiction may require all changes be grouped by the provision being changed. Whatever the jurisdictional requirements are, the system will match the XML changes document with the correct template model from the template library and construct a bill with the correct wording and hierarchical format required by the legislature and the correct changes desired by the drafter. An example of a bill representation is illustrated in FIG. 6.

Figure 8:
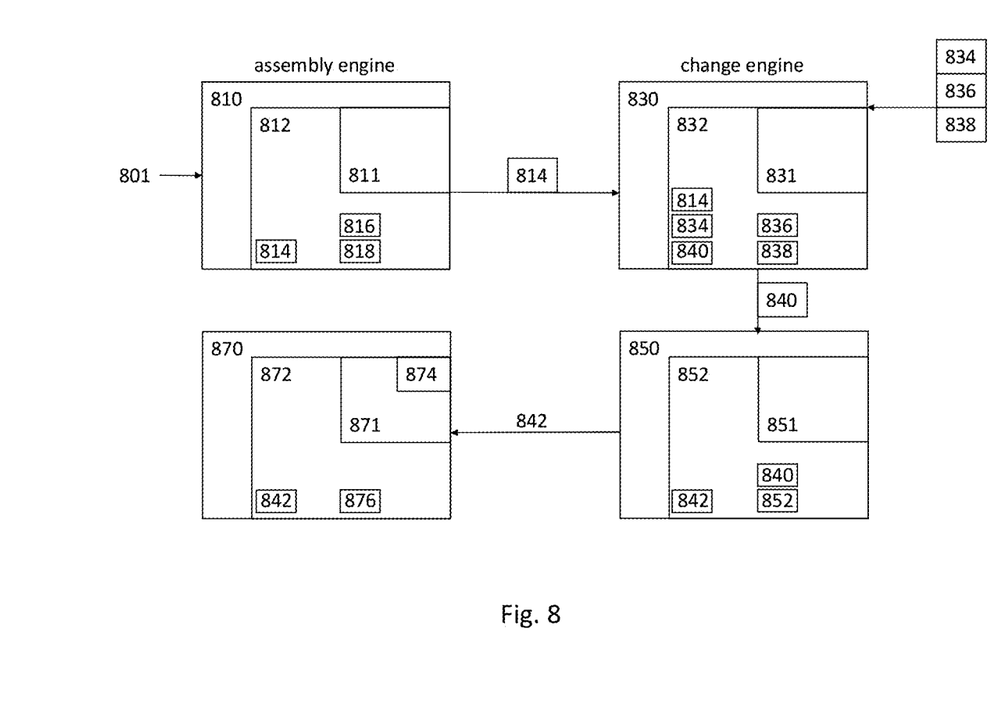
FIG. 8 depicts an exemplary embodiment of a system for implementing a method of law selection and document synthesis.

FIG. 8 depicts an exemplary embodiment of system 800 for implementing a method of law selection and bill synthesis.

System 800 includes an assembly engine 810 having an assembly software module 811 and an optional assembly storage 812. Assembly engine 810 may be a processor or a combination of a processing system and a storage system. Assembly engine 810 receives provisions of law 801 to be assembled into a snapshot document 814. The provisions of law 801 received by the assembly engine 810 are analyzed and the text 816 of the provision of law is inserted into the snapshot document. Further the assembly engine 810 determines a formalized reference 818. to denote the origin of each provision of law 801 received. The formalized reference may be associated with the text 816 of the provision of law 801 as origin metadata. Once all of the provisions of law 801 have been received, the assembly engine 810 assembles all of the text 816 of the provisions of law 801 and the formalized references 818 of the provisions of law 801 into the snapshot document 814. Optionally, assembly engine 810 may pass a copy of the provisions of law 801, the text 816, the formalized references 818, and the assembled snapshot document 814 to internal or external assembly storage 812 or other storage for permanent or temporary storage. Once all of the provisions of law 801 are received and the snapshot document 814 is assembled, the assembly engine 810 passes the snapshot document 814 to a change engine 830.

The provisions of law 801 received by the assembly engine 810 are the portions of the existing law to be modified for the bill. The portions of law to be changed can be a section of law or other hierarchical level defined by the preexisting law. In an embodiment, the provisions of law 801 are searched for and dropped into the snapshot document 814 by the user. In embodiments, the search may use preexisting capabilities offered by the editor, other websites, and/or manual methods. In embodiments, portions of the searching may be automated. For example, the drafting attorney may input or select a specific provision for modification and the system may automatedly determine any other provisions that will also need modification based on the original provision to be modified.

The text 816 of the provision of law 801 includes not only the textual words of the provision selected, but also the structure of the provision selected such that the text 816 of the selected provision of law 801 should appear in the snapshot document 814 the same way it appears in the existing law it was taken from.

The formalized reference 818 provides the exact location to the existing law where the provision was taken from. In an embodiment, the provisions of the law 801 that are incorporated into the snapshot document 814 are identified by the snapshot document 814 using reference pointers to where the original source of text of the provisions originated. In embodiments, the reference pointers are systematized references which express the information contained in a legal citation in the form of a Uniform Resource Locator (URL) in accordance with a standardized or agreed upon convention. These formalized references 818 precisely identify both the location and version of the original source of the text of the provisions. Therefore, based on the ability to particularly reference the location of the law to be changes, only the particular provision of the law that is being changed needs to be incorporated into the snapshot document, rather than the entire law.

The snapshot document 814 is an XML document created in a document editor (preferably in LEGISPRO® which is specifically configured to integrate with the current invention). However, any standard word processing system may be used provided the system of the present invention has been configured to operate in conjunction with the word processing system. The assembled snapshot document 814 contains the text 816 for all of the provisions of law 801 to changed and the formalized references 818 associated with all of the provisions of law 801. The appearance of the assembled snapshot document 814 is illustrated in FIG. 4.

System 800 also includes a change engine 830 having a change software module 831 and an optional change storage 832. Change engine 830 may be a processor or a combination of a processing system and a storage system. Change engine 830 receives the assembled snapshot document 814 from the assembly engine to process in-line changes and information about changes made to the provisions of law 801 incorporated in the snapshot document 814. As illustrated in FIG. 5, the change engine will display the snapshot document to a user in a document processing program. Ideally, the program will be the LEGISPRO® editor, but can be any document processing program that the advanced track changes features of LEGISPRO® have been configured to integrate with. The changes engine 830 will receive change sets 834, change set metadata 836, and text changes 838 to be made to and incorporated into the snapshot document 814. Once all change sets 834, change set metadata 836, and text changes 838 have been received, the change engine modifies the snapshot document into an updated snapshot document 840. Optionally, change engine 830 may pass a copy of the change sets 834, change set metadata 836, and text changes 838, the updated snapshot document 840, and the assembled snapshot document 814 to internal or external change storage 832 or other storage for permanent or temporary storage. Once all of the change sets 834, change set metadata 836, and text changes 838 are received and the updated snapshot document 840 is finalized, the change engine 830 passes the updated snapshot document 840 to a document synthesis engine 850.

As is illustrated in FIG. 5, the modifications to the snapshot document are performed in-context using some method of change tracking. Ideally, the method of track changes will use and incorporate change sets as defined in LEGISPRO®. This allows the user to make in-line changes to the provisions of the law and input record metadata for each group of legal effects—defining the legal effect, its dependences, the effective date, etc. If the changes are treated as accepted, the drafter can see how the new law will read if enacted. In embodiments, the change tracking will be categorized (i.e. color-coded categories) and may also incorporate other features of the editor. In embodiments, the change tracking abilities will include a robust set of change tracking features including change sets and nested changes as provided by the LEGISPRO® editor. In embodiments where the methods and systems disclosed are incorporated as part of a preexisting editor the in-context edits will be made using the preexisting editor with the robust set of change tracking features configured to incorporate with the preexisting editor. The change tracking capability of the editor is used to record the edits that are made as discreet insertion and/or deletion modifications. These insertion and deletions are recorded in the XML structures. In embodiments using LEGISPRO® the recordation of insertions and deletions in the XML structures are a pre-exiting feature of LEGISPRO®. In many cases, the changes that are proposed can have a complex effect on the law—making different changes for different reasons, coming into effect at varying dates, a consequential side-effect of another change, or other complexities. To capture this intent, the unique change set capability of LEGISPRO® may be used. In embodiments implemented using LEGISPRO®, change sets allow edits, being recorded as insertion and/or deletions, to be grouped into sets which can have metadata applied to them as a whole. In embodiments not using change sets, an alternate mechanism for recording metadata common to a grouping of modifications must be provided. This metadata can, among other things, describe the overall intent of the group of changes or assign an effective date. While describing the intent and effective data are the most common forms of metadata the attorney might want to record, the metadata mechanism is generalized so that other uses or relationships can be established such as dependencies on other change groups or the origins of the request for a change.

A change set 834 defines portions of text that will be grouped into having the same legal effect. Each section of text to be changed belonging to the same change set is a member of the change set. A legal effect may be a change in a tax, a prohibition, an incentive, among others. In addition, consequential or follow-on effects may need handled where the changes being proposed affect other existing aspects of the law. For example, a proposed change to existing law may be to lower a set of certain taxes and to provide additional time to pay said taxes, this would likely constitute two legal effects and two change sets. The first change set and legal effect would contain all changes required to adjust the tax rate to the new proposed amount. The second change set and legal effect would contain all changes required to extend the time limit to the proposed time limit. This is merely an example of the use of change sets to group legal effects. It should be understood that the change sets can be used to group and define legal effects in any way the user believes is appropriate for the changes to be made.

The change set metadata 836 provides information about the members of the change set and global data about how those members will be changed. The change set metadata 836 includes but is not limited to a description of the legal effect for the change set, dependencies of the change set, and effectivity rules for the change set.

The text changes 838 are each individual modification (insertion and/or deletion) made to the text 816 of the snapshot document 814. Using a change tracking mechanism in the editor of the snapshot document 814, in-context changes are made to the text 816 in the snapshot document 814 corresponding to each legal effect. Each in-context change is a text change 838.

The updated snapshot document 840 an XML document created in a document editor (preferably in LEGISPRO® which is specifically configured to integrate with the current invention) and is based on the received snapshot document

814. However, any standard word processing system may be used provided the system of the present invention has been configured to operate in conjunction with the word processing system. The updated snapshot document 840 contains all of the information from the snapshot document 814 (the text 816 for all of the provisions of law 801 to changed and the formalized references 818 associated with all of the provisions of law 801) and includes the change sets 834, change set metadata 836, and text changes 838 incorporated into the snapshot document 814. The appearance of the updated snapshot document 840 is illustrated in FIG. 5. In an embodiment, the change sets 834 are each graphically distinguished in the updated snapshot document 840, for example by color. In embodiments, change set metadata 836 is not graphically depicted in the updated snapshot document 840.

System 800 also includes a document synthesis engine 850 having a document synthesis software module 851 and an optional document synthesis storage 852. Document synthesis engine 850 may be a processor or a combination of a processing system and a storage system. Document synthesis engine 850 receives the updated snapshot document 840 from the change engine 830 to analyze the updated snapshot document 840 and transform it into an XML changes document 842. In an embodiment, the document synthesis engine 840 analyzes the updated snapshot document 840 by querying and tree walking the hierarchical structures and extracts and enumerates the change sets 834 from the updated snapshot document 840, extracts the change set metadata 836 from the updated snapshot document 840, and enumerates the text changes 838 for each change set 834 in the updated snapshot document 840. The document synthesis engine then clusters all related modifications to create an enumerated list of changes for each change set 834 For each change set 834 extracted, the document synthesis engine 850 creates a data structure 852 to contain all the necessary information, drafted in-context, as described above, and contains all the necessary metadata such that a properly constructed and formatted bill can be produced for each change set 834. The document synthesis engine 850 then complies the data structures 852 into the XML changes document 842. Optionally, document synthesis engine 850 may pass a copy of the updated snapshot document 840, XML changes document 842, and data structures 852 to internal or external document synthesis storage 852 or other storage for permanent or temporary storage. Once the XML changes document 842 is created, the document synthesis engine 850 passes the XML changes document 842 to a document synthesis engine 870.

FIG. 7 depicts an example of an embodiment of an internal data structure 852. The data structure 852 organizes the information in a hierarchical manner, where the top-level organizational construct is the change set 834. In additional embodiments, the change sets may also be incorporated into the lower levels of the data structure. In still further embodiments, the change set may be a lower level of the data structure groups and another level of the data structure may be the highest level. In embodiments where change sets are not being used, these organization levels and/or incorporations are omitted. The next level of the data structure 852 groups the data based on the provision of law being changed 801. Each provision is referenced by the identifying reference pointer 818. Ideally the identification of the provision will include the version of the provision, specifying the precise text at a specific point-in-time that is being amended. Then, within each identified provision, change instructions 854 are formulated. Change instructions 854 group individual modifications (insertion and deletion) together when their effect is adjacent or similarly connected (i.e. substitute "this" for "that" would be two changes—delete "this" and insert "that").

The bill synthesis engine 850 analyzes each modification to determine how the instruction is to store the location of the change. For example, the modification should be following/preceding the nth occurrence of specific text. The metadata, such as the title, effective date, reference pointers, etc., found with each level of this hierarchical structure are added to the appropriate levels in the data structure.

System 800 also includes a transformation engine 870 having a transformation software module 871 and an optional transformation storage 872. Transformation engine 870 may be a processor or a combination of a processing system and a storage system. Transformation engine 870 receives the XML changes document 842, analyzes it based on a template library 874 and creates the bill representation 876 based on the analysis and at least one template from the template library 874. In an embodiment, the transformation engine 8790 maps the changes in each change set of the XML changes document 842 to templates in the template library 874. Based on the mapping, the transformation engine 870 synthesizes the changes using the jurisdiction specific requirements of the template to create the bill representation 876. Once created, the bill representation 876, is presented and processed for the bill amendment process. Optionally, transformation engine 870 may pass a copy of the XML changes document 842 and the bill representation 876 to internal or external transformation storage 872 or other storage for permanent or temporary storage. Further, the bill representation 876 may be displayed to the user on a graphical user interface.

In an embodiment, the template library 874 contains an exhaustive suite of amending snippets that conform to the drafting rules and precise language prescribed by the different law-making bodies. Each template is a set of instructions and rules that will determine the precise wording of the bill representation based on the changes and data depicted in the XML changes document, including the type of changes to be made, the legal effect of the changes, the source of the law to be changed, etc. It should be understood that templates are jurisdiction specific based on the precise language required for bills in each jurisdiction. In an embodiment, this step may be automated, and the appropriate template is determined by the system. In an embodiment, this step may be determined by the user who selects the appropriate template. It should be understood that templates for other industries that require specific language and structure for documents could also be used in the system. It should be understood that each XML changes document may require more than one template to process all of the changes into the bill representation.

Each jurisdiction or even each legislative chamber may have their own rules for how a bill is structured and worded. These differences are handled by the library of templates used to formulate the bill. In an embodiment, each jurisdiction or legislative chamber may have a different template library or may have individual templates in the template library. In embodiments where XSLT is used as the transformation language, the library templates are modelled as parameterized XSLT templates. In embodiments, a master transform file contains a series of general-purpose templates as well as incorporating the jurisdiction-specific templates, referenced as inclusions. In this embodiment, once all the appropriate templates have been assembled, a transform engine is executed to produce the resulting bill. In this embodiment, an example of an appropriate transform engine is the Saxon XSLT application. In this embodiment, the resulting bill is an XML document which conforms to the precise language, construction, and formatting necessary for the bill to be introduced into the lawmaking body.

The bill representation 876 is a document that contains all of the in-line changes made to the provisions of law and all of the metadata information relating to said changes that is depicted in the precise and required format for the bill based on the jurisdiction in which the bill is to be presented. As is illustrated in FIG. 6, law changing language for bills is automatedly drafted using the template based on the changes made to the snapshot document which results in a formal bill document that uses the precise language prescribed by the lawmaking body and the precise format required by the lawmaking body in which the bill is to be introduced. In an embodiment, the bill synthesis engine uses the information found in the intermediate XML file to select the template which best implements the desired change—in the form of one or more statements that add to, amend, or repeal existing law. Typically, the language of a bill will vary if there are multiple legal effects, different effective dates, consequential amendments, single or multiple provisions being amended, dependencies on other proposed changes to the law, or other characteristics recorded in the metadata.

While the changes made to the snapshot document are made in-context to the original law being changed, the format of the presented bill is visually and contextually be quite different. For example, many legislative bodies require that bill present changes to source law in a hierarchical manner, rather than how the law will read when the changes have been adopted. This example is illustrated in FIG. 6. Sometimes, the way changes in a bill are presented are referred to as "cut-and-bite amendments" because of the manner in which they precisely isolate the modifications to be made. How the changes are organized in a bill will depend on a number of factors, including how the lawmaking body requires the bill to be presented. In embodiments using the change sets features of LEGISPRO®, the construction of the change sets will also determine how the changes are organized in the bill by allowing changes to be grouped by legal effect, effective date, or some other grouping. These groups will determine if the changes are each their own section of a bill, subsections grouped by provision or effect, or even lower level paragraphs in more complex cases. An example of this embodiment is illustrated in FIG. 6. Additional supporting provisions may be added to indicate conditions or dates of effectivity.

Figure 3:
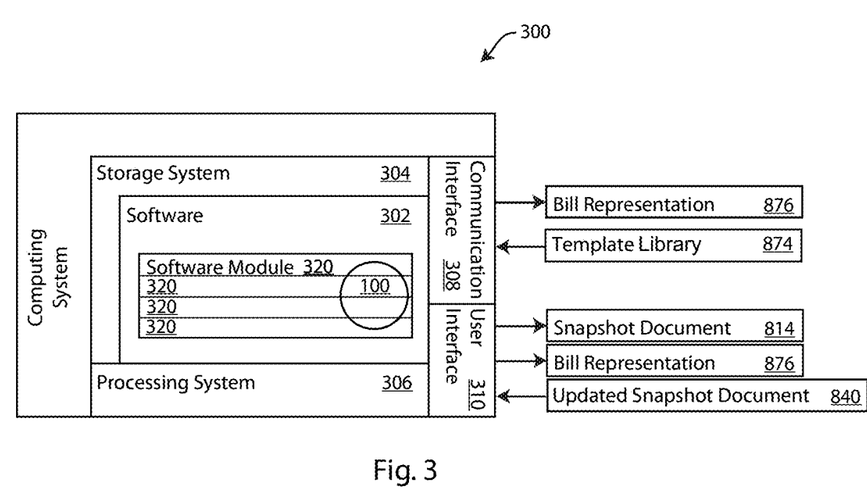
FIG. 3 depicts an exemplary embodiment of a system for implementing a method of law selection and document synthesis.

FIG. 3 depicts an exemplary embodiment of system 300 for implementing a method of law selection and bill synthesis.

System 300 is a computing system that includes a processing system 306, a storage system 304, software 302, a communication interface 308, and a user interface 310. Processing system 306 loads and executes software 302 from the storage system 304, including at least one software component 320. When executed by computing system 300, software component 320 directs the processing system 306 to operate as described herein in further detail in accordance with the method 100 and 200. Computing system 300 is a specialized system specifically designed to perform the steps and actions necessary to execute method 100 and 200. While some of the component options for computing system 300 may include components prevalent in other computing systems, computing system 300 is a specialized computing system capable of performing the steps and processes described herein.

Computing system 300 includes four software components 320 for performing the functions of law selection and document synthesis. Although computing system 300 as depicted in FIG. 3 includes four software components 320 for the assembly engine software component 811, the change engine software component 831, the document synthesis engine software component 851, and the transformation engine software component 871 in the present example, it should be understood that one or more components could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include central processing units, application specific processors, and logic devices, as well as any other type of processing device, combinations of processing devices, or variations thereof. While there are a number of processing devices available to comprise the processing system 306, the processing devices used for the processing system 306 are particular to this system and must specifically be capable of performing the processing necessary to execute method 100 and 200 and support the system.

The storage system 304 can comprise any storage media readable by processing system 306, and capable of storing software 302 that is able to meet the needs of the specific computing system 300 and execute the storage required for method 100 and 200. The storage system 304 may include volatile and non-volatile, removable, and non-removable media implemented in any method or technology for storage of information, such as computer readable instructions, data structures, program modules, or other data. Storage system 304 may be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300. While many types of storage media may be incorporated into system 300, the storage media used must be specialized to the purpose of executing the storage requirements of method 100 and 200 as described herein, including data structure 852.

User interface 310 can include one or more desktops, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display snapshot documents, updated snapshot documents, data structures, bill representations on the desktop, or another interface further associated with embodiments of the system and method as disclosed herein. Speakers, printers, haptic devices, and other types of output devices may also be included in the user interface 310. A user can communicate with computing system 300 through the user interface 310 in order to view snapshot documents, updated snapshot documents, data structures, bill representations, or any number of other tasks a user may want to complete with computing system 300.

As described in further detail herein, computing system 300 receives and transmits data through communication interface 308. In embodiments, the communication interface 308 operates to send and/or receive data, such as, but not limited to, template libraries, and bill representations to/from other devices and/or systems to which computing system 300 is communicatively connected, and to receive and process into bill representations as described in greater detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems, and method steps. It is to be expected that various equivalents, alternatives, and modifications are possible within the scope of the appended claims.

What is claimed is:

1. A method of bill synthesis, the method comprising:
    receiving at least one provision of law to be included in a snapshot document, wherein the snapshot document includes a set of original text for each provision of law to be changed;
    determining a formalized reference for each provision of law included in the snapshot document, wherein the formalized reference is an original location for the provision of law;
    receiving at least one in-line change to the set of original text for each provision of law, wherein the at least one change includes an insertion of text or a deletion of text into the text of the provision;
    assigning each in-line change to at least one change set, wherein each change set represents a different legal effect, further wherein each change set groups each in-line change to the same legal effect;
    receiving change set metadata associated with each change set, wherein the change set metadata includes a set of dependencies;
    creating an updated snapshot document including the set of original text for each provision of law, the formalized reference for each provision of law, the in-line changes, the change sets, and the change set metadata for each change set;
    automatedly extracting and enumerating from the updated snapshot document the change sets;
    automatedly extracting from the updated snapshot document the change set metadata for each change set;
    automatedly extracting and enumerating all changes made to the set of original text for each change set, wherein the extraction includes a reference to an exact location in the set of original text where the change occurs;
    clustering adjacent changes for each change set together to create an enumerated list of changes for each change set;
    constructing an internal data structure for each extracted change set, wherein the data structure includes a hierarchical representation of the changes to be made for each change set, the change set metadata, and the formalized reference for each provision included in the change set;
    creating an XML changes document for each data structure constructed from the updated snapshot document;
    analyzing the XML changes document based on a template library to determine at least one template model to synthesize a bill representation;
    mapping the XML changes document to the at least one template model to create jurisdiction specific language for the bill representation using the changes from each change set in the data structures of the XML changes document;
    generating the bill representation based on the mapping, wherein the bill representation provides the in-context changes from the updated snapshot document, the change set metadata from the updated snapshot document, and the formalized reference for each provision in a formalized manner and a manner required by a particular jurisdiction;
    displaying to a user the generated bill representation; and
    presenting the generated bill representation to a legislature from the particular jurisdiction.

2. The method of claim 1, wherein the change set metadata includes a description of the legal effect and a set of effectivity rules for the change set.

3. The method of claim 1, the method further comprising storing the snapshot document and storing the updated snapshot document.

4. The method of claim 1, the method further comprising defining the at least one change set and change set metadata prior to receiving the at least one in-line change.

5. The method of claim 1, wherein the internal data structure is organized with the change set at a top level, the provision of law to be changed at a next level, and the adjacent in-line changes at a bottom level.

* * * * *